United States Patent [19]

Winkler et al.

[11] 4,046,626
[45] Sept. 6, 1977

[54] PRESSURIZED-WATER REACTOR EMERGENCY CORE COOLING SYSTEM

[75] Inventors: Franz Winkler; Harald Helf, both of Erlangen, Germany

[73] Assignee: Kraftwerk Union Aktiengesellschaft, Mulheim (Ruhr), Germany

[21] Appl. No.: 523,888

[22] Filed: Nov. 14, 1974

[30] Foreign Application Priority Data

Nov. 20, 1973  Germany .................. 2357893

[51] Int. Cl.² .............................................. G21C 9/00
[52] U.S. Cl. ........................................ 176/38; 176/65
[58] Field of Search .................................. 176/37, 38

[56] References Cited

U.S. PATENT DOCUMENTS

| | | | |
|---|---|---|---|
| 3,528,884 | 9/1970 | Collier et al. | 176/37 |
| 3,649,451 | 3/1972 | Yedidia et al. | 176/37 |
| 3,819,476 | 6/1974 | Pocock | 176/37 |
| 3,865,688 | 2/1975 | Kleimola | 176/37 |
| 3,929,567 | 12/1975 | Schabert et al. | 176/38 |
| 3,966,548 | 6/1976 | Müller et al. | 176/37 |

FOREIGN PATENT DOCUMENTS 7,402,590 . 3/1973  Netherlands ...................... 176/37

*Primary Examiner*—Samuel W. Engle
*Assistant Examiner*—Ralph Palo
*Attorney, Agent, or Firm*—Kenyon & Kenyon, Reilly, Carr & Chapin

[57] ABSTRACT

An emergency core cooling system for a pressurized-water reactor provides one supply of emergency water under pressure for injecting into the reactor's pressure vessel's lower plenum through a check valve, and a separate supply of emergency water under pressure for injecting into the vessel's upper plenum through a second check valve, the pressure on both supplies of emergency water being lower than the pressure of the reactor's coolant under normal reactor operating conditions. Because each plenum is separately supplied with emergency water when required, the pressures and flow rates can be designed for core cooling efficiency in the event of an accident.

2 Claims, 2 Drawing Figures

PRESSURIZED-WATER REACTOR EMERGENCY CORE COOLING SYSTEM

BACKGROUND OF THE INVENTION

A conventional emergency core cooling system for a pressurized-water reactor ordinarily comprises a single accumulator containing a supply of emergency core cooling water, and connected to a single check valve so as to feed in parallel into the hot and cold legs of the reactor's coolant loop. The accumulator pressure is less than the pressure of the reactor coolant under normal operating conditions. In the event of a loss-of-coolant accident, the reactor coolant pressure drops to below the accumulator pressure, the check valve, previously held closed by the reactor coolant pressure, then opening under the accumulator pressure, the emergency core cooling water then being injected as parallel flows, simultaneously into both legs of the coolant loop.

The reactor has its core contained within a pressure vessel having connections with the hot and cold legs of the coolant loop, and internally constructed to form a lower or cold plenum into which the reactor coolant flows from the cold leg, for upward travel through the core, and an upper or hot plenum which receives the coolant, now heated by its core cooling action, and which connects with the hot leg. Ordinarily the emergency core cooling water is simultaneously injected into both plenums by connections with these legs of the coolant loop.

The coolant loop comprises the pressure vessel, the pipe forming the hot leg and which connects with a heat exchanger (a steam generator for producing power) and the pipe line forming the cold leg and which through the main coolant pump carries the coolant back to the pressure vessel. Any break in this loop permits the pressurized-water coolant to escape and stops the coolant circulation through the reactor core which then rapidly overheats. The accident drops the pressure in the two plenums and results in the injection of the emergency core cooling water into these plenums with the object of flooding the core as quickly as possible until other portions of the system can start a circulation of water into the core. The emergency core cooling system involves other functions which need not be described in connection with the present subject matter.

The simultaneous injection of the emergency water into both plenums has been considered to be important to provide the redundancy of safety precautions requred in the case of nuclear installations.

However, the cooling efficiency and speed thus obtained, should be improved if possible, and such improvements is the object of the present invention.

SUMMARY OF THE INVENTION

According to the present invention, each plenum is provided with its own accumulator and check valve, each accumulator and check valve being entirely independent of the other accumulator and check valve. The accumulator pressure in both accumulators is, of course, less than the pressure of the reactor coolant under normal operating conditions, so each check valve is normally closed by the coolant pressure. However, the pressure in the accumulator connecting with the lower plenum of the pressure vessel, is made higher than the pressure in the accumulator connecting through its check valve with the upper plenum.

The above has the advantage that in the event of a relatively small leak in the reactor coolant loop, dropping the pressure in the pressure vessel only slightly and with the reactor coolant continuing to circulate to some degree, the lower plenum's emergency system can operate individually to augment the reduced coolant supply by injection of emergency cooling water into the lower plenum, providing time for corrective measures to be taken. On the other hand, in the event of a loss-of-coolant accident, representing possibly a comlete break in one of the loop pipe lines, producing a large pressure drop in both plenums, the accumulator having the higher accumulator pressure goes into action first, introducing its emergency water into the lower plenum for upward flow in the core and possibly against what may be a relatively high pressure remaining in the pressure vessel. Thereafter, the other accumulator goes into action to inject water into the upper plenum to condense the steam generated from the initially introduced water, by the core.

Furthermore, because the higher pressure water injected into the lower plenum is not required for steam condensation, it may be introduced at a lower flow rate, whereas the water introduced to the upper plenum, should be introduced at a higher flow rate to effect the condensation of the steam, although its pressure need not be so great because in the reactor pressure vessel has at that time dropped to a lower value. The accumulator pressures can, of course, be adjusted in the usual manner, while the flow rates may be adjusted either by the sizes of the pipes required to connect the accumulators to the plenums or by the use of flow chokes in one or both instances.

It is to be understood that a pressurized-water power reactor ordinarily has a multiplicity of the coolant loops referred to herein above, the foregoing applying as to each of these coolant loops. From the economic viewpoint, this means doubling the number of accumulators, check valves and the incidental piping required, as compared to the prior art arrangement. However, these components may be made smaller and, therefore, less expensive than required before and, although different volumes of water may be academically indicated, in the case of upper and lower plenum injections, both accumulators may be made of the same size to effect an economy in their procurement.

BRIEF DESCRIPTION OF THE DRAWINGS

The presently preferred mode for carrying out the invention is illustrated entirely schematically by the accompanying drawings, in which.

DETAILED DESCRIPTION OF THE INVENTION

Figure 1:
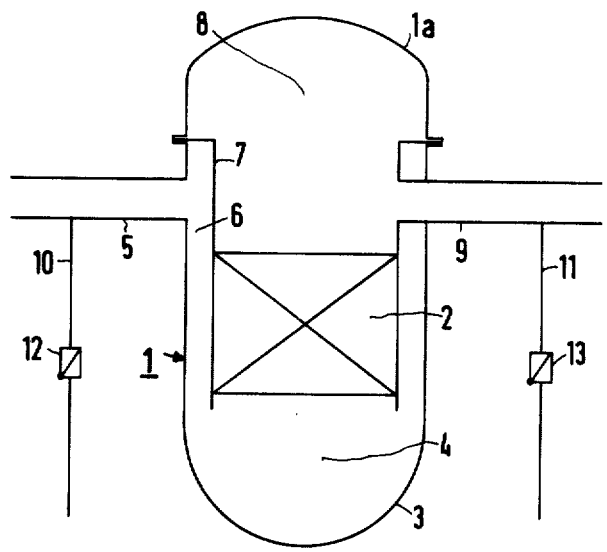
FIG. 1 is a vertical section showing a typical pressurized-water reactor to which the principles of the invention are applied, this view showing only the portions of the hot and cold legs adjacent to the pressure vessel.

Referring first to FIG. 1, the reactor pressure vessel 1 encloses the core 2, this core being spaced below the usual removable upper head 1a, and above the spherical bottom 3 of the pressure vessel. The lower or cold plenum 4 receives the circulating reactor coolant from the cold leg 5, the coolant flowing down the descent space 6 formed between the inside of the pressure vessel and the outside of the core barrel 7 which positions and surrounds the core 2. The coolant flows upwardly through the core 2 to the upper or hot plenum 8 and from there outwardly through the hot leg 9. Conventionally, emergency core cooling water is fed to the plenums by way of connections to the hot and cold legs adjacent to the reactor, so in this instance the injection pipes 10 and 11, which respectively connect with the check valves 12 and 13, are shown as being connected to the cold and hot legs respectively. However, the emergency water injection could be by connections through the pressure vessel itself, for direct injection into the plenums.

Figure 2:
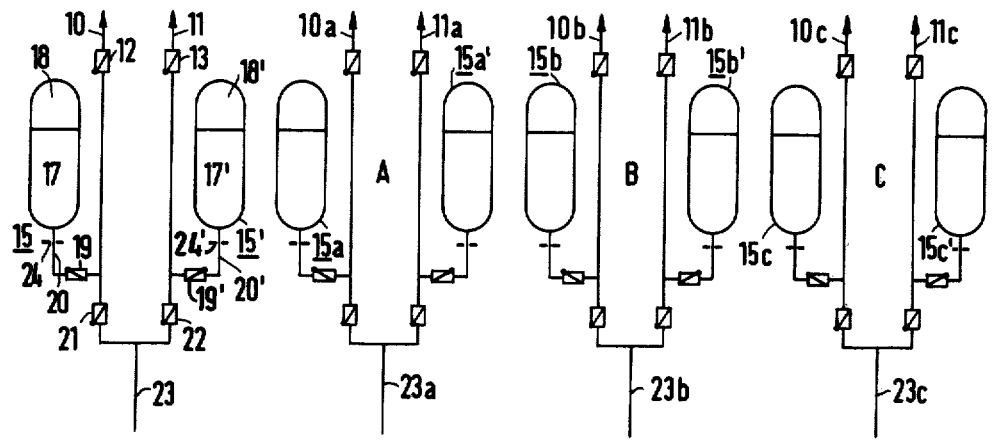
FIG. 2 is a flow sheet showing the invention as it is applied to the four coolant loops conventionally used in the case of the reactor of a size that would currently be considered a relatively high-powered plant installation.

In FIG. 2 arrangements are shown for four coolant loops, but this description will be limited to an application to only one of the loops, this application being shown as the first or the left-hand one of the installations shown by FIG. 2. The other three to the right, A, B, and C, are correspondingly numbered but identified separately by the small letters a, b and c applied only where required for general identification.

Going now to the far left-hand portion of FIG. 2, accumulators 15 and 15' connect respectively with the pipes 10 and 11 and through the check valves 12 and 13, shown in FIG. 1. Both accumulators contain water 17 and 17' above which gas cushions 18 and 18', respectively, pressurize the water. This water is preferably borated water. Both accumulator pressures must be less than the normal operating pressure of the reactor coolant, the pressure of the latter keeping the valves 12 and 13 normally closed. When the reactor coolant pressure drops in the coolant loop, and, therefore, in the two plenums, due to a loss-of-coolant accident, to a pressure less than the accumulator pressures, one or the other or both of the check valves 12 and 13 can then open for the emergency cooling action.

The accumulator 15, connected with the cold leg 5, through the pipe 10 and check valve 12, has its gas 18 at the highest pressure, such as in the area of 60 bar when the normal reactor coolant pressure is at its currently conventional value. This pressure is higher than that of the gas cushion 18' of the accumulator 15'. In addition, the accumulator 15, connecting with the pipe 10 through a redundant check valve 19, does so by a pipe 20 having a flow choke 24. The other accumulator 15' has corresponding parts connecting this accumulator to the hot leg 9 by way of the pipe 11 and check valve 13. However, the flow choke 24' provides for a higher flow rate than does the flow choke 24', and the pressure of the gas cushion 18' is lower than that of the pressure of the gas cushion 18.

In operation, if the reactor coolant loop has only a leak producing a relatively small drop in the pressure in the coolant loop and, therefore, in the plenums 4 and 8, the accumulator 15 goes into action, its gas cushion 18 driving the supply of emergency water 17 through the then opening check valves 19 and 12 and into the cold leg 5 for flow to the cold plenum 4 and, therefore, adding to the reduced flow of reactor coolant. In that event, the check valves 19' and 13 remain shut, preserving the supply of water 17'.

On the other hand, in the event of a loss-of-coolant accident, the accumulator 15 operates first because of the high pressure of its gas cushion 18, injecting its emergency water into the lower or cold plenum 4 against any pressure remaining within the pressure vessel. The water rising in the vessel 1 results in the upper or hot plenum 8 filling with steam, but by that time, due to continuing pressure drop within the pressure vessel caused by the continued drop of pressure in the coolant loop, the accumulator 15' goes into action, and due to the design of its flow choke 24', introducing at a higher rate the large volume of water required in the upper or hot plenum 8 to condense the steam in that plenum, avoiding a steam pressure build-up within the pressure vessel 1.

The pipe 23 which feeds into the pipes 10 and 11 through the check valves 21 and 22 is part of the overall emergency core cooling system, the balance of which may be conventional. This provides for a circulation through the core after the loss-of-coolant accident and the initial emergency action of the present invention.

To summarize the operation, with this invention, instead of simultaneous emergency core-cooling water into both the upper and lower plenums, the injection is first into the lower plenum and under a pressure high enough to ensure the injection against any pressure remaining within the pressure vessel after a substantial accident, and high enough for the injection in case the reactor coolant pressure has only dropped a somewhat smaller amount under its normal operating pressure. The volume of water required for this initial injection need only be enough to initially flood the core 2. Thereafter, the following injection, which can occur very quickly, is to the upper plenum and at a high flow rate to get a large volume of water into the upper plenum for condensation of the steam which inevitably collects in that plenum, this condensing the steam and preventing the development of excessive pressure inside of the pressure vessel. The differing flow rates may be effected either by the use of flow chokes or connecting pipe sizes, the different pressurizing of the two accumulators being done in the conventional fashion. The sequential operation is entirely automatic and free from the need of any actuation by the usual reactor protective system or the other associated components of the overall emergency core cooling system.

What is claimed is:

1. An emergency core cooling system for a pressurized-water reactor pressure vessel containing a core and forming a lower plenum having an inlet for receiving pressurized-water coolant for upward flow through said core, and an upper plenum receiving said coolant from said core and having an outlet connection for said coolant, said system having a first means for holding a first supply of emergency water under a first pressure and for connecting this first supply through a check valve to said lower plenum, and a second means for holding a second supply of emergency water under pressure and for connecting this second supply through a second check valve to said upper plenum, said pressure of both said means being lower than the pressure of the pressurized-water coolant when said upward flow is adequate to cool said core, said check valves opening in the event said pressure of said coolant drops below said pressure of said means, so that said supplies flow into said plenum, said second means providing a flow of said second supply into said upper plenum, at a greater rate than the flow rate provided by said first means of said first supply into said lower plenum.

2. The system of claim 1 in which said second means provides a flow of said second supply into said upper plenum, at a greater rate than the flow rate provided by said first means of said first supply into said lower plenum, said pressure of said first means being higher than said pressure of said second means.

* * * * *